United States Patent
Phillips et al.

(10) Patent No.: US 6,594,533 B2
(45) Date of Patent: Jul. 15, 2003

(54) SYSTEM AND METHOD FOR PERFORMING ELECTRONIC TRIAGE OF A TURBINE PART

(75) Inventors: Ann Mary Phillips, Avon, CT (US); Vrinda Rajiv, Guilderland, NY (US); Kevin Julius Pallos, Roswell, GA (US)

(73) Assignee: General Electric Company, Niskayuna, NY (US)

( * ) Notice: Subject to any disclaimer, the term of this patent is extended or adjusted under 35 U.S.C. 154(b) by 86 days.

(21) Appl. No.: 09/681,230

(22) Filed: Mar. 2, 2001

(65) Prior Publication Data

US 2002/0123827 A1 Sep. 5, 2002

(51) Int. Cl.$^7$ ............................................... G06F 17/00
(52) U.S. Cl. ........................................................ 700/90
(58) Field of Search ..................... 705/7, 8, 29; 702/81; 707/104.1; 700/90

(56) References Cited

U.S. PATENT DOCUMENTS

| | | | | |
|---|---|---|---|---|
| 5,216,612 A | * | 6/1993 | Cornett et al. ................. 700/96 |
| 5,225,996 A | * | 7/1993 | Weber ......................... 702/187 |
| 5,987,474 A | * | 11/1999 | Sandifer .................... 707/104.1 |
| 6,292,806 B1 | * | 9/2001 | Sandifer .................... 707/104.1 |
| 6,338,045 B1 | * | 1/2002 | Pappas ......................... 705/29 |

* cited by examiner

Primary Examiner—Leo Picard
Assistant Examiner—Alexander Kosowski
(74) Attorney, Agent, or Firm—David C. Goldman; Patrick K. Patnode

(57) ABSTRACT

A system and method for performing electronic triage of a turbine part. A triage storage unit stores a variety of repair information. A repair triage application facilitates the repair of the turbine part in accordance with the repair information stored in the triage storage unit. A computing unit is configured to execute the repair triage application. A second computing unit is configured to serve the triage storage unit and the repair triage application to the first computing unit over a network.

43 Claims, 11 Drawing Sheets

Fig. 7

SYSTEM AND METHOD FOR PERFORMING ELECTRONIC TRIAGE OF A TURBINE PART

BACKGROUND OF INVENTION

This disclosure relates generally to a turbine part and more particularly to performing an electronic triage of a turbine part such as a blade or bucket.

The market for long-term contractual agreements has grown at high rates over recent years for many of today's power systems businesses. As the power systems businesses establish long-term contractual agreements with their customers, it becomes important to provide a variety of service solutions for each of their products. One area where adequate service solutions are lacking is with the repair of turbine parts, in particular buckets. For example, buckets for a gas turbine are currently repaired using a manual process that is slow and fails to take into account historical information that could be useful in making repair decisions. In particular, when a set of buckets is brought into a service center, they are logged as one single job. The individual buckets are visually inspected to determine whether to repair or scrap them. Information on individual buckets is captured as verbose text that is not searchable for future use. Therefore, each decision to repair or not to repair a bucket is made without regard to historical information of other buckets that may have exhibited similar symptoms. Without adequate information available to make a repair decision, some buckets may be subjected to repair when it is not necessary and some buckets may not undergo repair when it is necessary. The buckets that do not undergo repair that need it will eventually have to receive repair. This is not a very efficient approach to servicing a bucket.

In order to avoid the problems associated with the above repair process, there is a need for an approach that uses historical information to quickly and accurately facilitate the decision process in determining whether to repair the buckets or to scrap them.

SUMMARY OF INVENTION

In one embodiment of this disclosure, there is a system and method that facilitates the repair of a turbine part. In this embodiment there is a triage storage unit that stores a plurality of repair information. A repair triage application facilitates the repair of the part in accordance with the plurality of repair information stored in the triage storage unit. A computing unit is configured to execute the repair triage application.

In a second embodiment of this disclosure, there is a system and method that facilitates the repair of a turbine part. In this embodiment there is a triage storage unit that stores a plurality of repair information. A repair triage application facilitates the repair of the part in accordance with the plurality of repair information stored in the triage storage unit. A first computing unit is configured to execute the repair triage application. A second computing unit is configured to serve the triage storage unit and the repair triage application to the first computing unit over a network.

BRIEF DESCRIPTION OF DRAWINGS

FIG. 1 shows a schematic of a general-purpose computer system in which a system that facilitates the repair of a turbine part operates on;

FIG. 7 shows an additional example of a screen view taken from the parts tracking module;

DETAILED DESCRIPTION

Figure 1:
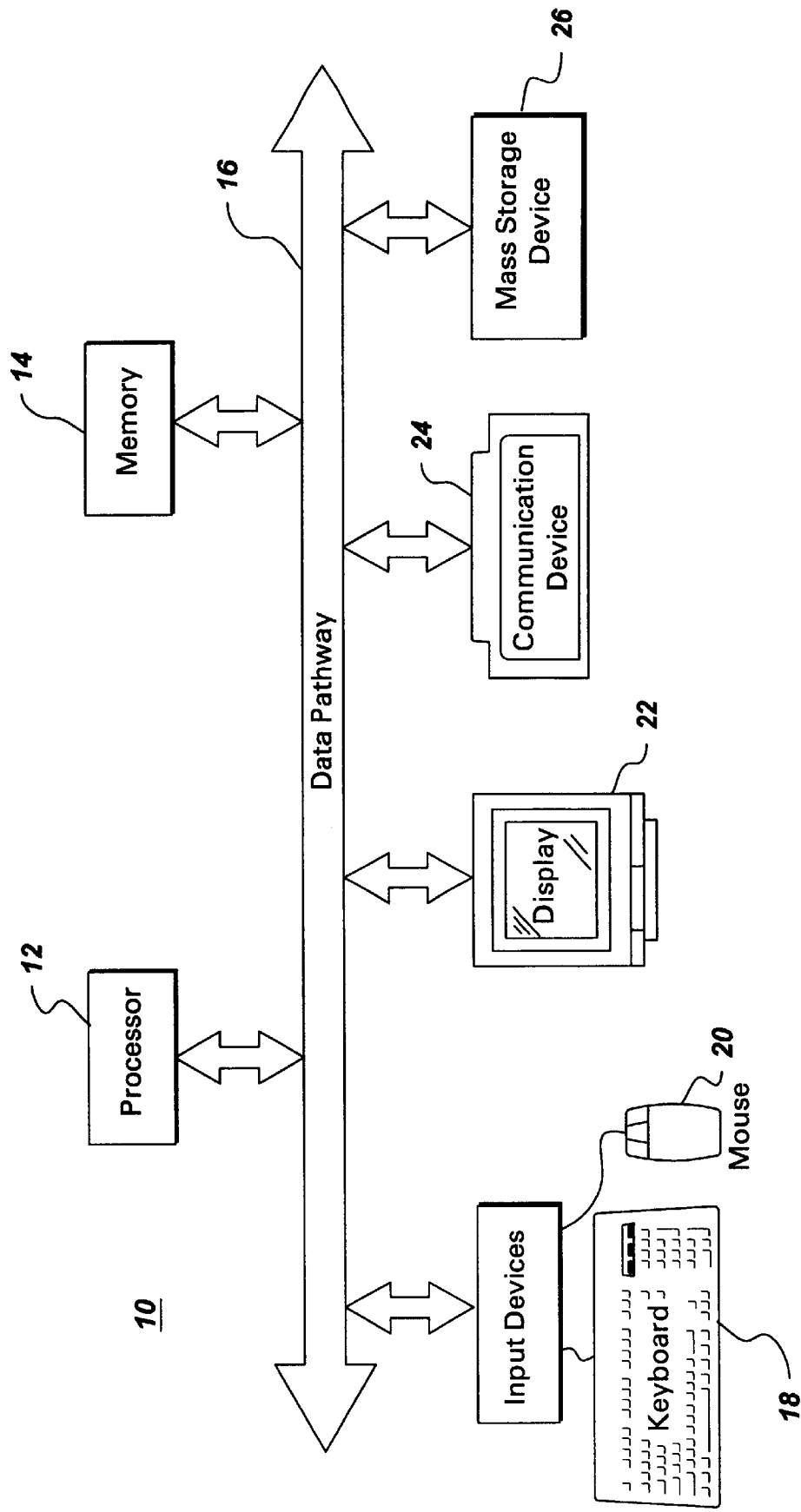

FIG. 1 shows a schematic of a general-purpose computer system 10 in which a system for facilitating the repair of a turbine part such as a blade or bucket operates on. The computer system 10 generally comprises at least one processor 12, memory 14, input/output devices, and data pathways (e.g., buses) 16 connecting the processor, memory and input/output devices. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. A display 22 allows a user to see what the computer has accomplished. Other output devices could include a printer, plotter, synthesizer and speakers. A communication device 24 such as a telephone or cable modem or a network card such as an Ethernet adapter, local area network (LAN) adapter, integrated services digital network (ISDN) adapter, or Digital Subscriber Line (DSL) adapter, that enables the computer system 10 to access other computers and resources on a network such as a LAN or a wide area network (WAN). A mass storage device 26 allows the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, personal computer, workstation, mini-computer, mainframe computer or supercomputer.

Figure 2:
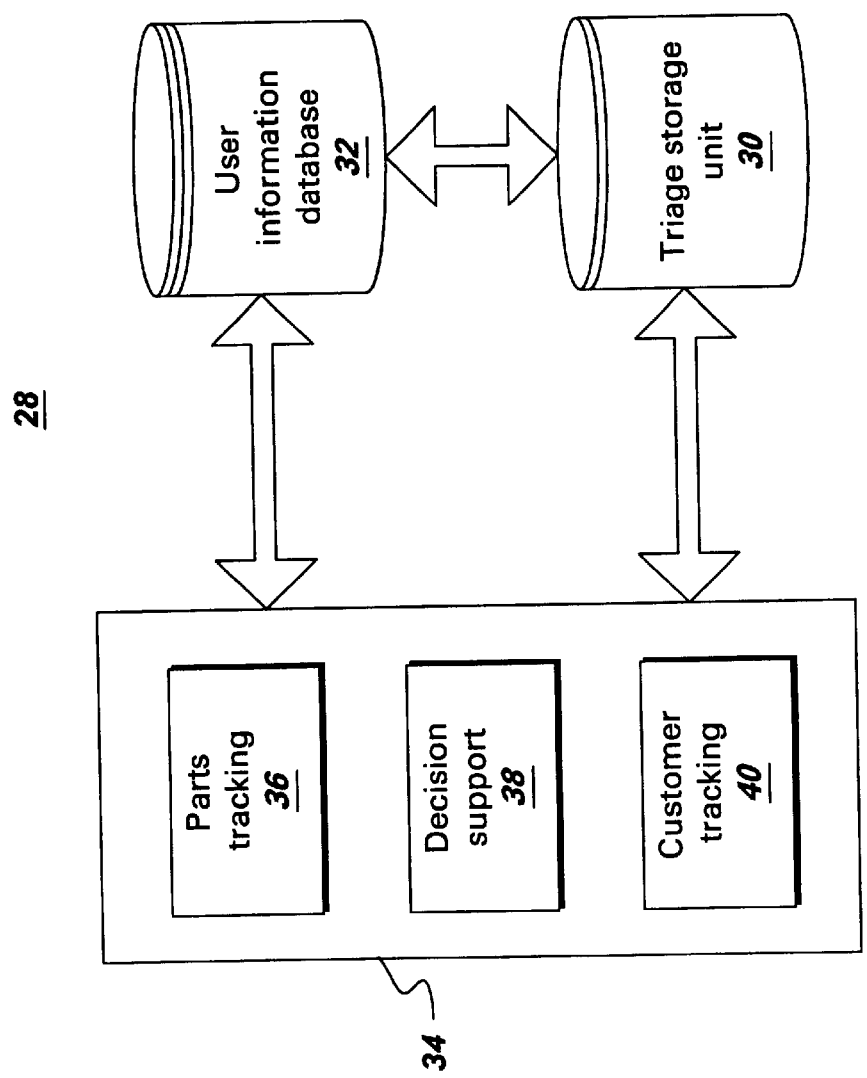
FIG. 2 shows a schematic diagram of the turbine part repair system that operates on the computer system shown in FIG. 1.

FIG. 2 shows a top-level component architecture diagram of a system 28 for facilitating the repair of a turbine part that operates on the computer system 10 shown in FIG. 1. In FIG. 2 there is a triage storage unit 30 that contains information that users of the system 28 access. The triage storage unit 30 comprises a variety of information such as part pedigree information, component design criteria, operational parameters, repair history, repair statistics and repair analytics for a plurality of turbines. The part pedigree information comprises the life history of a plurality of turbine parts for the turbines. Each life history of a part includes the turbines on which the part was placed, the conditions under which the turbines were run and the part repair history of the part. The component design criteria comprise information such as engineering drawings for the various turbine parts of the turbines. The operational parameters comprise the conditions under which the turbines were operated. Examples of some operational parameters are load, type of start and ambient temperature and type of fuel used and the number of trips. The repair history comprises information on the type of repairs made to the turbines. The repair statistics comprise information gathered during repairs of any of the turbines. Examples of repair statistics are inspection tests performed, the results of the tests, the repairs made, the time taken to perform the repairs, cost of the repairs and the number of repairs performed on any of the parts in the turbines. Repair analytics comprise information (e.g., trends in the part condition, prediction of remaining life) on repairs made to any of the parts of the turbines. These examples are illustrative of only a few items of information that may be stored in the triage storage unit 30 and one of ordinary skill in the art will recognize that other items of information can be stored therein.

A user information database 32 contains identity and security information for users of the system 28. Specifically, the user database 32 contains general information such as phone numbers, addresses, the type of user (e.g., customers, engineers, administrators, etc.), e-mail addresses, passwords, login identification, etc. This information enables the system 28 to authenticate all on-line users accessing the system and have an access control mechanism for different users such as shop personnel, design engineers and customers. The user information database 32 can take the form of a lightweight directory access protocol (LDAP) database, however, other types of databases can be used.

A repair triage application 34 facilitates the repair of the turbine part in accordance with the plurality of repair information stored in the triage storage unit 30. The repair triage application 34 comprises a parts tracking module 36 that tracks parts of the turbine during repair and inspection such as buckets, nozzles, rotors, shafts, etc. The parts tracking module 36 comprises a job module that assigns a job number for the part and provides job information for the part during inspection and repair. The job information comprises an inspection schedule for the part and any inspection results for the part and a repair schedule and any repair results. In addition, the parts tracking module comprises an inspection schedule module that plans the inspection for the part. Also, the parts tracking module 36 comprises a repair schedule module that plans the repair of the part.

The repair triage application 34 also comprises a decision support module 38 that determines whether a part needs to be repaired or should be scrapped. The decision support module comprises a search module that searches the triage storage unit 30 for other parts that have experienced conditions similar to the bucket undergoing examination. In addition, the decision support module comprises a cost benefit analysis module that determines the costs and benefits associated with repairing the part or scrapping the part.

Another module associated with the repair triage application 34 is the customer tracking module 40. This module enables a customer to track the progress of a job being performed for them without having to call a service engineer. In this module, a customer enters the assigned job number on a screen and the system will display the status of the job. In addition, the customer tracking module 40 shows the customer the steps that are planned, those that are completed, those that the part has passed and those that the part has failed. Also, the customer tracking module 40 informs the customer of the expected date that the job will be finished.

In addition to the above modules, the repair triage application 34 may comprise other modules that run utilities for performing special tasks. For example, there can be utilities for administering and performing maintenance functions. Other utilities that may be used are utilities for creating, modifying and deleting user profiles.

Figure 3:
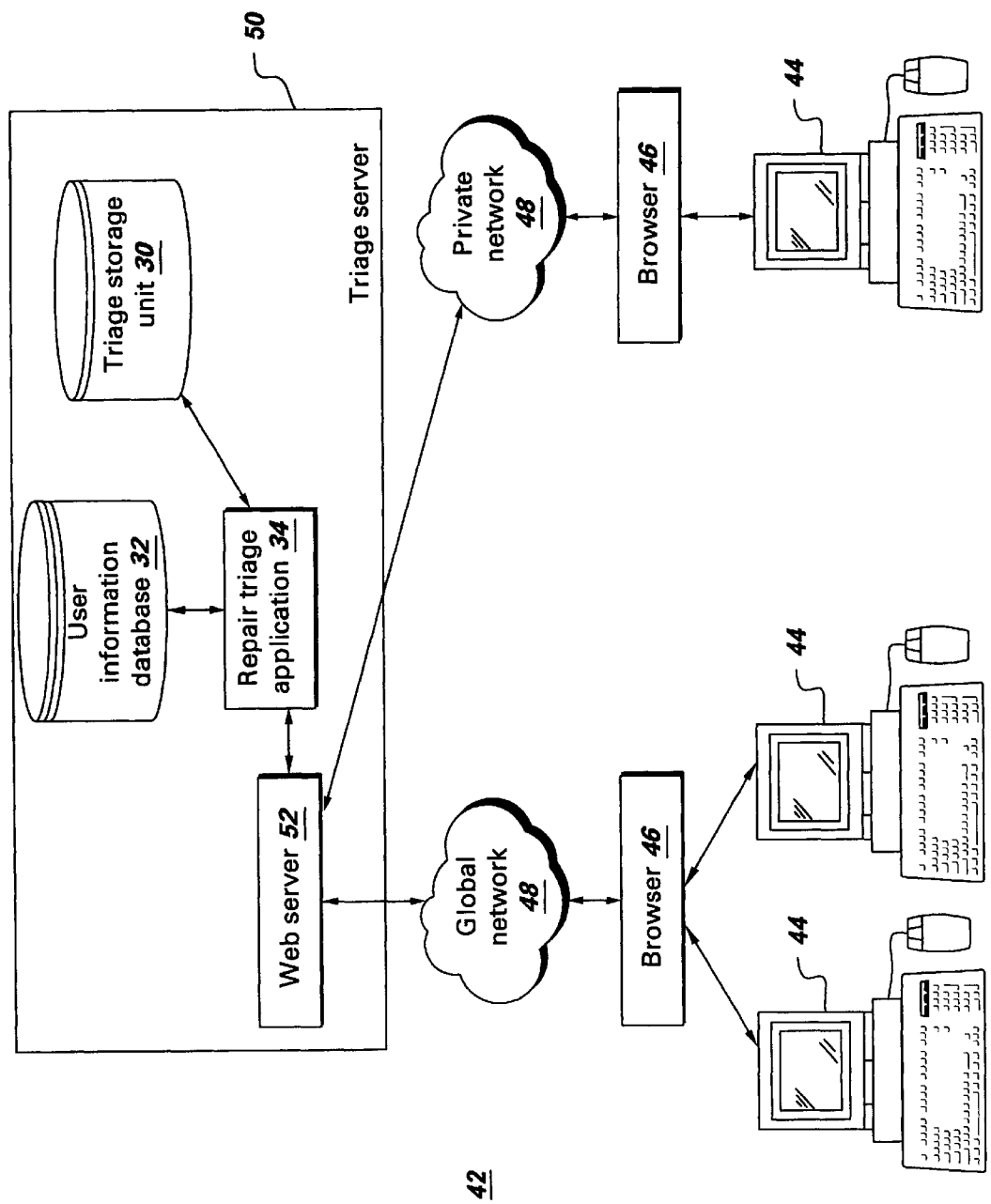
FIG. 3 shows a system architecture diagram for implementing the system shown in FIG. 2.

FIG. 3 shows a system 42 architecture diagram for implementing the system shown in FIG. 2. FIG. 3 shows that there are several ways of accessing the system 28. A computing unit 44 allows shop personnel, design engineers, decision makers, administrators, etc. to access the system 28. Also, customers access the system 28 through a computing unit 44. The computing unit 44 can take the form of a hand-held digital computer, personal digital assistant computer, personal computer or workstation. The shop personnel, design engineers, decision makers, administrators, customers and any other users use a web browser 46 such as Microsoft INTERNET EXPLORER or Netscape NAVIGATOR to locate and display the system 28 on the computing unit 44. A communication network connects the computing unit 44 to the system 28. FIG. 3 shows that the computing units 44 may connect to the system 28 through a private network 48 such as an extranet or intranet or a global network 48 such as a WAN (e.g., Internet). For example, shop personnel, design engineers, decision makers and administrators can access the system 28 via an extranet or intranet, while other users such as customers could access it through an extranet or the Internet. The system 28 resides in a triage server 50, which comprises a web server 52 that serves the repair triage application 34, triage storage unit 30 and the user information database 32.

Figure 4:
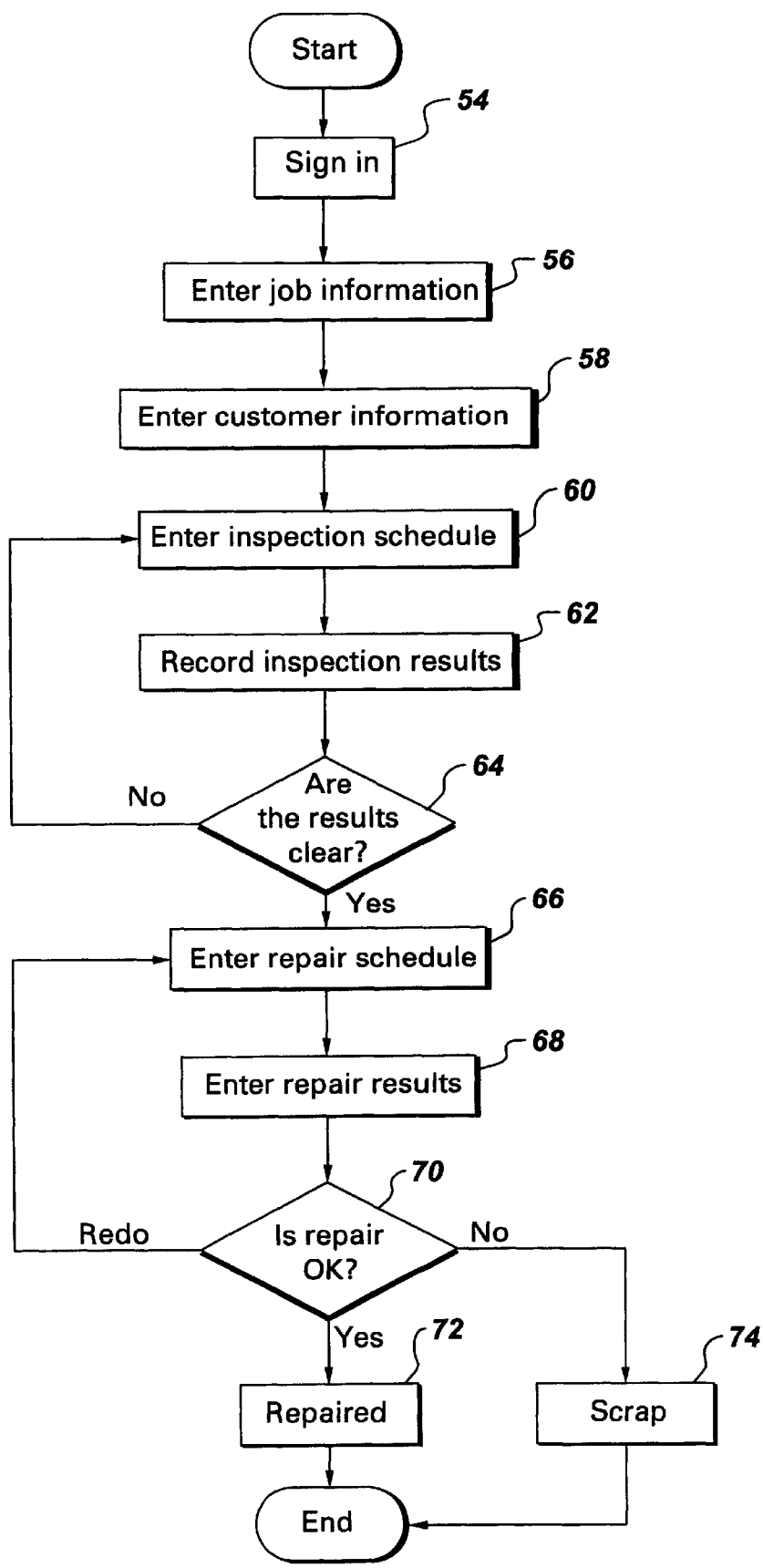
FIG. 4 shows a flow chart describing the acts performed during the parts tracking module shown in FIG. 2.

FIG. 4 shows a flow chart describing the acts performed during the parts tracking module shown in FIG. 2. At block 54, a user such as a design engineer, service personnel, turbine operator, administrator or customer signs into the system 28. The sign-in act can include entering identity and security information (e.g., a valid username and password). As previously mentioned, the user information database 32 contains identity and security information for users of the system 28. Furthermore, the user information database 32 may have an access control mechanism that allows users (e.g., design engineers, service personnel, turbine operators, administrators or customers) to have different roles in accessing the system 28. For example, the parts tracking module and the decision support module can be made accessible only to design engineers, service personnel, turbine operators, or administrators and off limits to other users. Similar restrictions can be made for the customer tracking module 40.

A user continues with the parts tracking module once access control and authentication has been completed.

Figure 5:
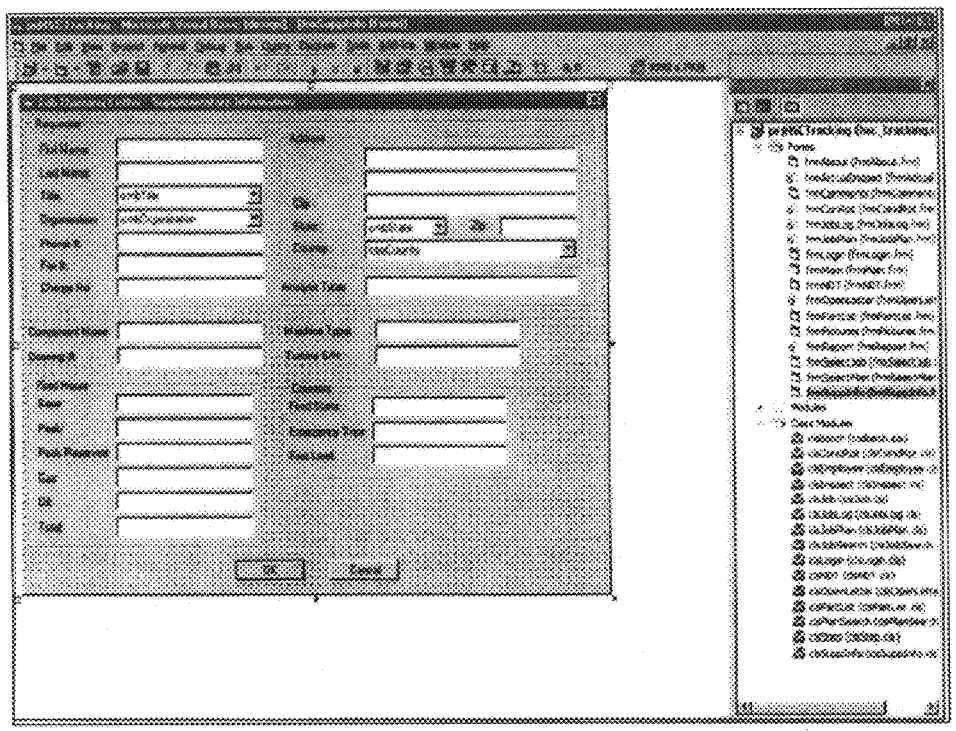
FIG. 5 shows an example of a screen view of job information details presented to a user and filled in by the user while running the parts tracking module.
Figure 6:
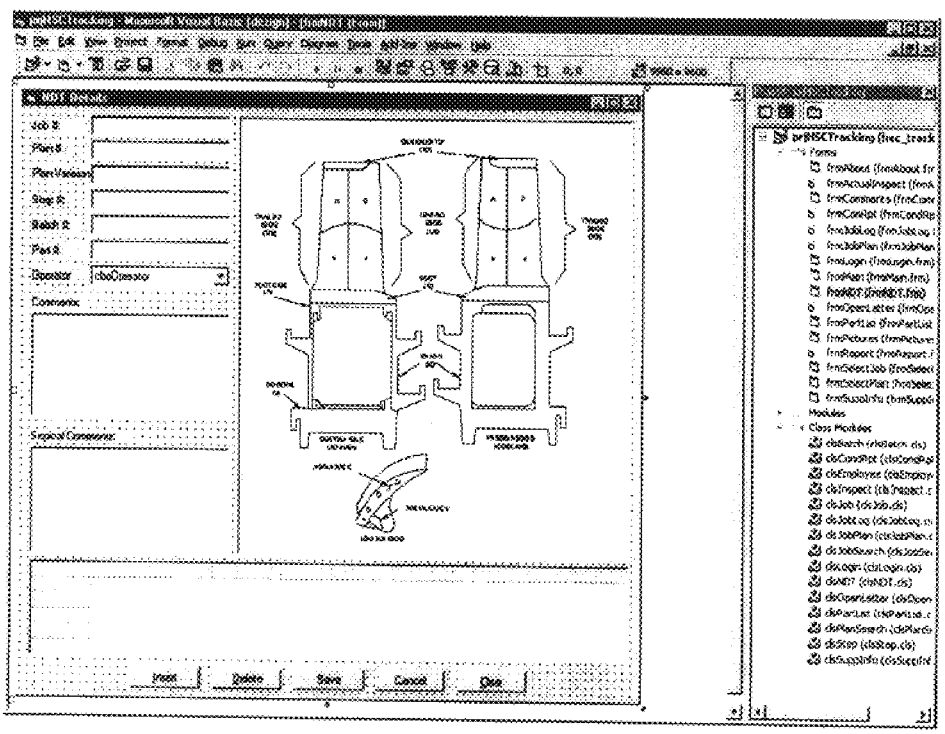
FIG. 6 shows another example of a screen view taken from the parts tracking module.

Initially, the user enters job information for a part at 56. Entering the job information comprises information such as the assigned job number, the number of parts in the job, the number assigned to the turbine which the part belongs to, etc. If the parts tracking module is unable to find the job in the triage storage unit 30 that matches the entered criteria, then a message is displayed to the user instructing him or her to enter the details of the job. FIG. 5 shows an example of a screen view of job information details that is presented to the user and filled in by the user. Details of the job as the user enters them are displayed in a screen view similar to the one shown in FIG. 6.

Figure 7:
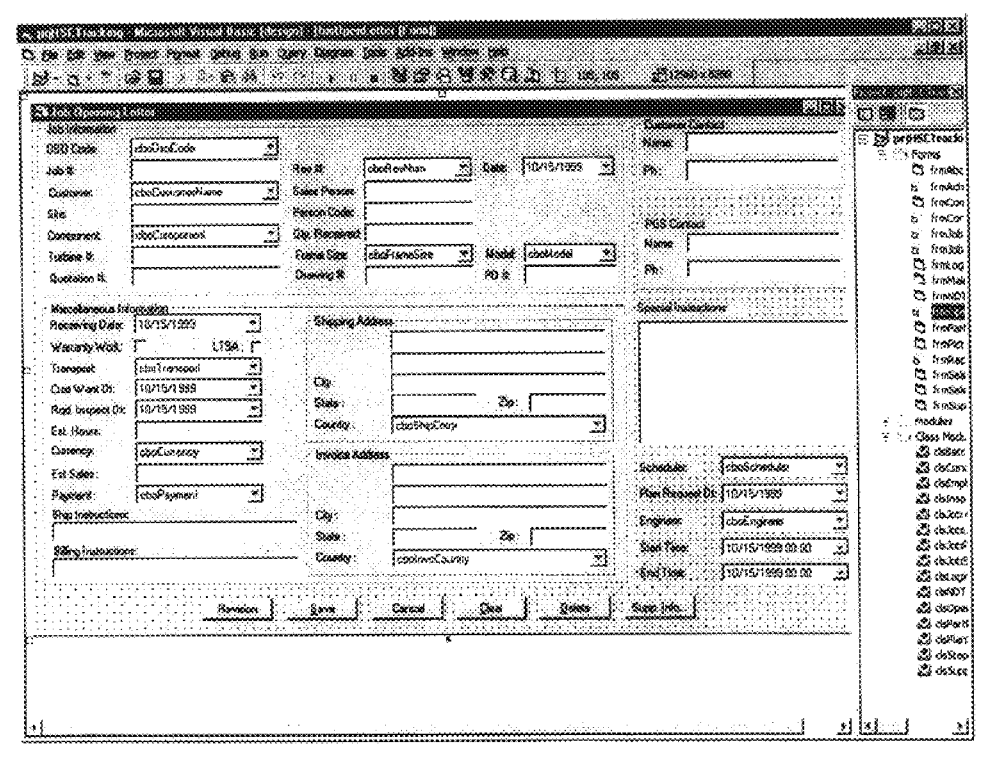

Referring back to FIG. 4, in addition to the job information, the user enters customer information at 58 for the particular job. The customer information comprises information such as the customer name, location and address of the customer, customer contact, phone number of the customer contact, etc. FIG. 7 shows a screen view that prompts a user to enter job information, customer information and other miscellaneous information while running the parts tracking module. One skilled in the art will recognize that other information can be entered into the system upon initiating the parts tracking module.

Figure 8:
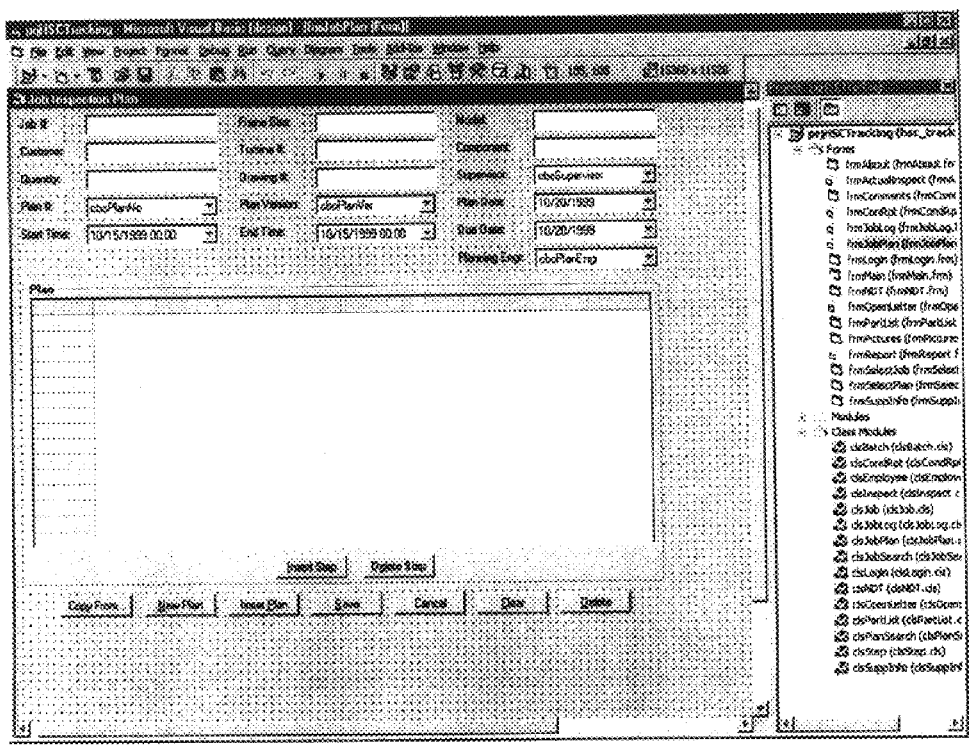
FIG. 8 shows an example of a screen view of an inspection planning schedule that may be presented to a user while running the parts tracking module.

Referring again to FIG. 4, at 60, the user enters the inspection planning schedule of the job. The inspection planning schedule comprises a series of steps to be performed on the parts in the job. In an exemplary embodiment, each part of the turbine has a template of steps that have to be followed to complete the inspection phase. For instance, there is an inspection planning schedule for the various parts of a turbine such as a bucket, nozzle, rotor, shaft, etc. FIG. 8 shows a screen view of an inspection planning schedule that may be presented to a user while running the parts tracking module. Note that this screen view does not show a particular template; however, one skilled in the art will know of various steps that have to be performed when inspecting parts of a turbine and will be able to generate an appropriate schedule. For example, an inspection schedule could comprise performing steps such as a manual inspection, photo inspection, water flow test of cooling holes, a heat treatment, etc. These inspection steps are illustrative of only a few steps that can be performed and are not exhaustive of other possibilities.

Figure 9:
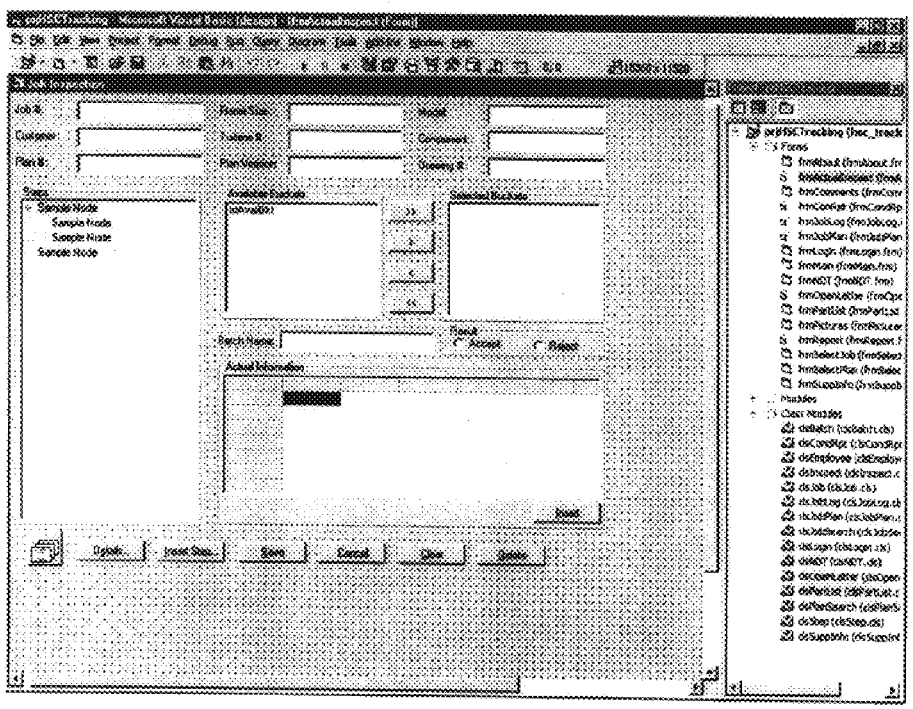
FIG. 9 shows an example of a screen view that may be presented to a user that provides inspection results for a particular part while running the parts tracking module.

In FIG. 4, a user enters the inspection results at 62. The inspection results may comprise information such as the condition of the part at each of the various steps of the inspection schedule. In addition, the inspection results may indicate whether the part has passed or failed each of the steps of the inspection schedule. One skilled in the art will recognize that other information can be captured for the inspection results. FIG. 9 shows an example of a screen view that may be presented to a user that provides inspection results for a particular part. If the inspection results are not clear as determined at 64 then the inspection schedule is revised and the part or parts of the job are inspected again and the results are reviewed.

Upon receipt of the inspection results, the user then enters a repair schedule at 66. The repair schedule comprises a series of steps to be performed on the parts in the job to make it operate in a satisfactory manner. Like the inspection schedule, the repair schedule for each part of the turbine has a template of steps that have to be followed to complete the repair phase. For instance, there is a repair schedule for the various parts of a turbine such as a bucket, nozzle, rotor, shaft, etc. For example, a repair schedule could comprise performing some of the following repairs: a blend repair of an airfoil, a blend repair of a cooling hole, a touchup of buckets, a weld repair, a wire check of cooling holes, etc. These repairs are illustrative of only a few types that can be performed and are not exhaustive of other possibilities.

The user enters the repair results at 68 after the repair schedule has been run. The repair results may comprise information such as the person that performed the repairs, the start time of the repairs, the end time of the repairs, a description of the repairs performed, the amount of material used to make the repairs, the equipment used to make the repairs, whether the repairs were a success or failure, etc. One skilled in the art will recognize that other information can be captured for the results. If the repair has to be repeated as determined at 70 then the part or parts of the job are subjected to the repair schedule again. If the repair results are okay as determined at 70 then the part or parts are considered repaired at 72. Alternatively, if the repair results are not okay as determined at 70 then the part or parts of the job are considered scrap at 74.

Figure 10:
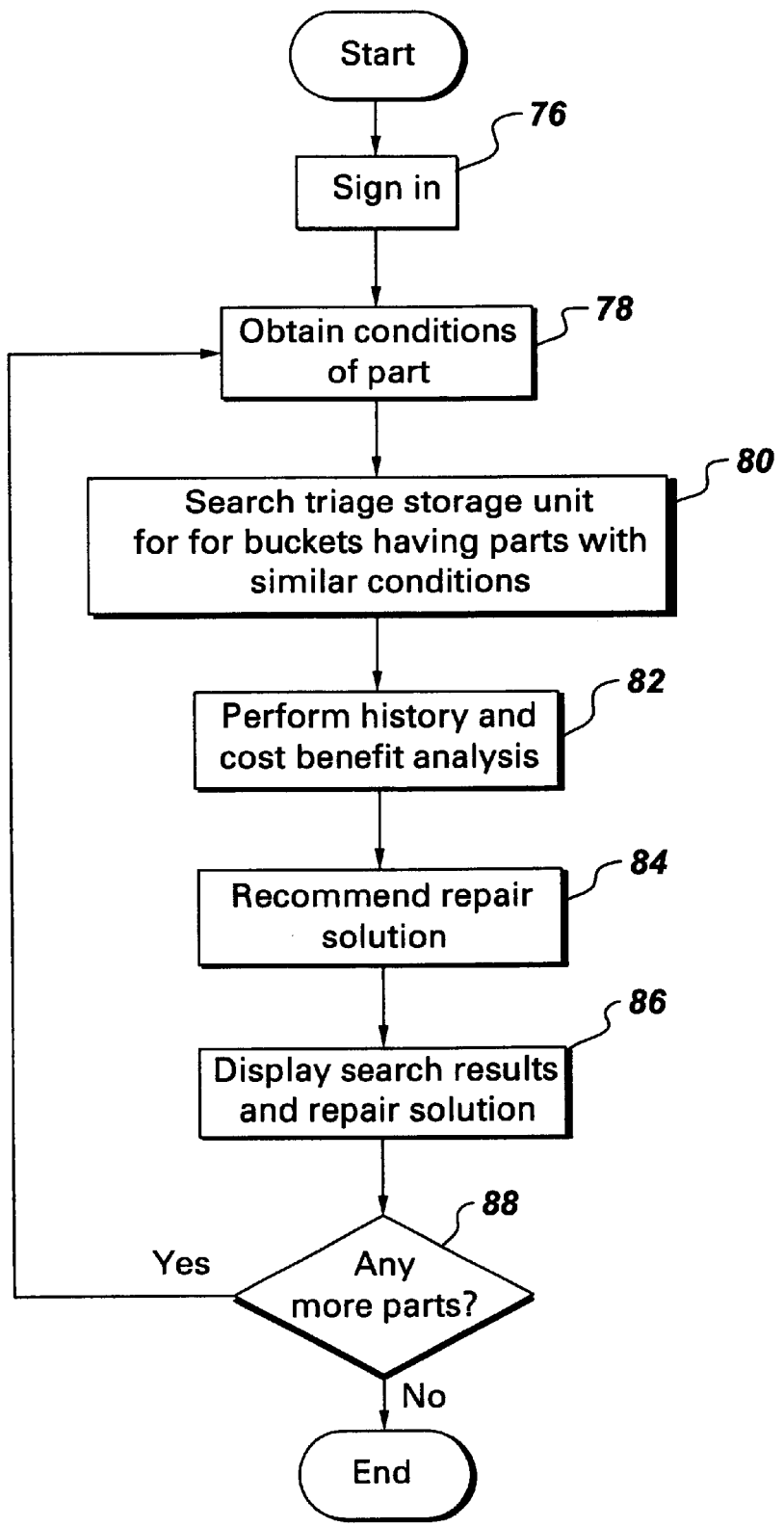
FIG. 10 shows a flow chart describing the acts performed during the decision support module shown in FIG. 2.

FIG. 10 shows a flow chart describing the acts performed during the decision support module shown in FIG. 2. At block 76, a user signs in and selects the decision support module. Afterwards, the user obtains the conditions of the part of the turbine undergoing a repair decision at 78. Specifically, the user obtains the conditions by entering the job number that has been assigned to the part. Next, the user searches the triage storage unit for parts having similar conditions as the part undergoing review at 80. More specifically, the user selects the data from the information received that best describes the condition of the part. Based on that data the system 28 searches the triage storage unit 30 for parts that had similar conditions when undergoing previous repair decisions. This search also provides other information such as the repair process of those similar parts and the costs to repair. The system 28 then uses the search results to perform a history and cost benefit analysis at 82. The history of the parts shows the part pedigree, the conditions under which the turbine operated and the repair statistics. The cost benefit analysis provides the historical cost of repair for a similar part versus the remaining life of the part. The cost benefit analysis also shows the difference in cost between repair and a replacement part. Note that the replacement part could be new or refurbished.

Referring again to FIG. 10, the system 28 recommends a repair solution for the subject part at 84 in accordance with the history and cost benefit analysis. Generally, the repair solution will entail fixing the part or scrapping it. If the part is to be fixed, the repair solution corresponds to the repair solutions of the parts that most closely relate to the subject part. All of the search results and the repair solution are displayed to the user at 86. If there are any more parts that have to be reviewed for a repair decision as determined at 88, then blocks 78–86 are repeated until there are no more parts.

Figure 11:
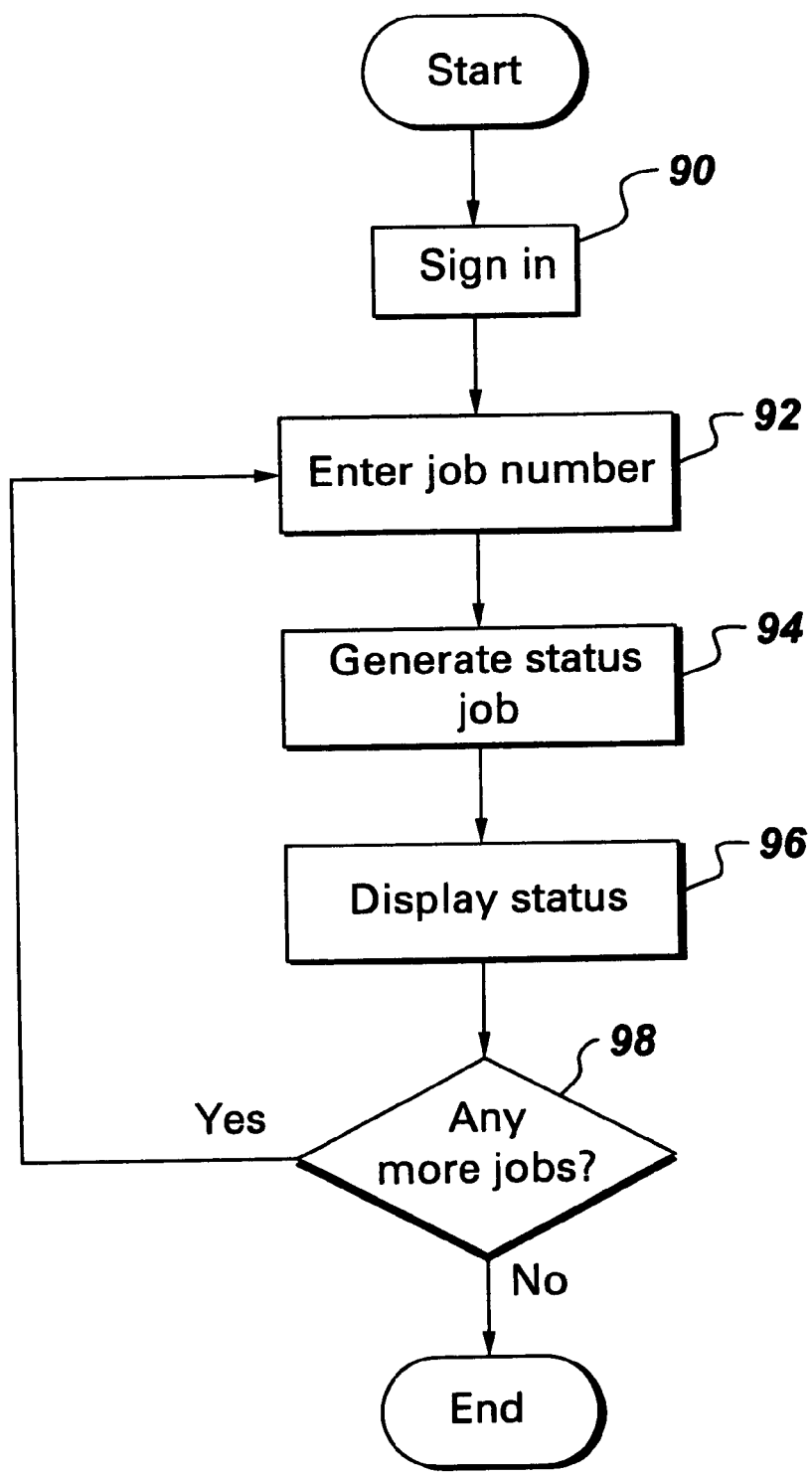
FIG. 11 shows a flow chart describing the acts performed during the customer tracking module shown in FIG. 2.

FIG. 11 shows a flow chart describing the acts performed during the customer tracking module shown in FIG. 2. As mentioned above, this module enables a customer to track the progress of a job being performed for them without having to call a service engineer. At block 90, a customer signs in and selects the customer tracking module. After signing in, the customer enters the job number assigned to the customer at 92. Upon entering the job number, the customer tracking module generates the status of the job at 94 and displays the results to the customer at 96. The status information comprises information such as the planned inspection schedule, those inspection steps that have been completed, the inspection results, the repair schedule, the results of any completed repair steps and the time that the job is expected to be completed. If the customer wants to track the status of another job as determined at 98, then blocks 92–96 are repeated until there are no more jobs to be tracked. Alternatively, if there are no more jobs then the customer tracking module ends.

The foregoing flow charts of this disclosure show the functionality and operation of a possible implementation of the system and method for performing electronic triage of a turbine part. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved. Furthermore, the functions can be implemented in programming languages such as C++ or JAVA, however, other languages such as Visual Basic can be used.

The above-described system and method for performing electronic triage of a turbine part comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this disclosure, a system, method, and computer product for performing electronic triage of a turbine part. While the invention has been particularly shown and described in conjunction with a preferred embodiment thereof, it will be appreciated that variations and modifications can be effected by a person of ordinary skill in the art without departing from the scope of the invention.

What is claimed is:

1. A system for facilitating repair of a turbine part, comprising:
   a triage storage unit that stores a plurality of repair information comprising part pedigree information, component design criteria, operational parameters, repair history, repair statistics and repair analytics;
   a repair triage application that facilitates the repair of the part in accordance with the plurality of repair information stored in the triage storage unit, wherein the repair triage application comprises a parts tracking module that tracks the part during inspection and repair, a decision support module that determines whether the part needs repair or removal from future use, and a customer tracking module that enables a customer of the part to track the status during inspection and repair; and
   a first computing unit configured to execute the repair triage application.

2. The system according to claim 1, wherein the parts tracking module comprises a job module that assigns a job number for the part and provides job information for the part during inspection and repair.

3. The system according to claim 2, wherein the job information comprises inspection schedule and inspection results and repair schedule and repair results.

4. The system according to claim 1, wherein the parts tracking module comprises an inspection schedule module that plans the inspection for the part.

5. The system according to claim 1, wherein the parts tracking module comprises a repair schedule module that plans the repair of the part.

6. A The system according to claim 1, wherein the decision support module comprises a conditions search module that searches the triage storage unit for other parts that have experienced similar conditions.

7. The system according to claim 1, wherein the decision support module comprises a cost benefit analysis module that determines the costs and benefits associated with repairing the part or scrapping the part.

8. The system according to claim 1, wherein the decision support module comprises a repair solution module that recommends a solution to repair the part.

9. The system according to claim 1, further comprising a second computing unit configured to serve the triage storage unit and the repair triage application to the first computing unit over a network.

10. A system for facilitating repair of a turbine part, comprising:
    a triage storage unit that stores a plurality of repair information comprising part pedigree information, component design criteria, operational parameters, repair history, repair statistics and repair analytics;
    a repair triage application that facilitates the repair of the part in accordance with the plurality of repair information stored in the triage storage unit, wherein the repair triage application comprises a parts tracking module that tracks the part during inspection and repair, a decision support module that determines whether the part needs repair or removal from future use, and a customer tracking module that enables a customer of the part to track the status during inspection and repair;
    a first computing unit configured to execute the repair triage application;
    a network; and
    a second computing unit configured to serve the triage storage unit and the repair triage application to the first computing unit over the network.

11. The system according to claim 10, wherein the parts tracking module comprises a job module that assigns a job number for the part and provides job information for the part during inspection and repair.

12. The system according to claim 11, wherein the job information comprises inspection schedule and inspection results and repair schedule and repair results.

13. The system according to claim 10, wherein the parts tracking module comprises an inspection schedule module that plans the inspection for the part.

14. The system according to claim 10, wherein the parts tracking module comprises a repair schedule module that plans the repair of the part.

15. The system according to claim 10, wherein the decision support module comprises a conditions search module that searches the triage storage unit for other parts that have experienced similar conditions.

16. The system according to claim 10, wherein the decision support module comprises a cost benefit analysis module that determines the costs and benefits associated with repairing the part or scrapping the part.

17. The system according to claim 10, wherein the decision support module comprises a repair solution module that recommends a solution to repair the part.

18. A system for facilitating repair of a turbine part, comprising:

means for storing a plurality of repair information comprising part pedigree information, component design criteria, operational parameters, repair history, repair statistics and repair analytics;

means for facilitating the repair of the part in accordance with the plurality of repair information stored in the storing means, wherein the facilitating means comprises means for tracking the part during inspection and repair, means for determining whether the part needs repair or removal from future use, and means for enabling a customer of the part to track the status during inspection and repair; and means for executing the facilitating means.

19. The system according to claim 18, wherein the tracking means comprises means for assigning a job number for the part and providing job information for the part during inspection and repair.

20. The system according to claim 19, wherein the job information comprises inspection schedule and inspection results and repair schedule and repair results.

21. The system according to claim 18, wherein the tracking means comprises means for planning the inspection for the part.

22. The system according to claim 18, wherein the tracking means comprises means for planning the repair of the part.

23. The system according to claim 18, wherein the determining means comprises means for searching the triage storage unit for other parts that have experienced similar conditions.

24. The system according to claim 18, wherein the determining means comprises means for performing a cost benefit analysis that determines the costs and benefits associated with repairing the part or scrapping the part.

25. The system according to claim 18, wherein the determining means comprises means for recommending a solution to repair the part.

26. The system according to claim 18, further comprising means for serving the storing means and the facilitating means to the executing means over a network.

27. A method for facilitating repair of a turbine part, comprising:

storing a plurality of repair information comprising part pedigree information, component design criteria, operational parameters, repair history, repair statistics and repair analytics;

providing a repair triage application that facilitates the repair of the part in accordance with the plurality of repair information;

using a first computing unit configured to execute the repair triage application;

using the repair triage application to track the part during inspection and repair;

using the repair triage application to determine whether the part needs repair or removal from future use; and using the repair triage application to enable a customer to track the status during inspection and repair.

28. The method according to claim 27, further comprising using the repair triage application to assign a job number for a part and provide job information during inspection and repair.

29. The method according to claim 28, wherein the job information comprises inspection schedule and inspection results and repair schedule and repair results.

30. The method according to claim 27, further comprising using the repair triage application to schedule the inspection of the part.

31. The method according to claim 27, further comprising using the repair triage application to plan the repair of the part.

32. The method according to claim 27, further comprising using the repair triage application to search the stored plurality of repair information for other parts that have experienced similar conditions.

33. The method according to claim 27, further comprising using the repair triage application to perform a cost benefit analysis that determines the costs and benefits associated with repairing the part or scrapping the part.

34. The method according to claim 27, further comprising using the repair triage application to recommend a solution to repair the part.

35. The method according to claim 27, further comprising configuring a second computing unit to serve the stored plurality of repair information and the repair triage application to the first computing unit over a network.

36. A method for facilitating repair of a turbine part, comprising:

storing a plurality of repair information comprising part pedigree information, component design criteria, operational parameters, repair history, repair statistics and repair analytics;

providing a repair triage application that facilitates the repair of the part in accordance with the plurality of repair information;

using a first computing unit configured to execute the repair triage application;

providing a network;

configuring a second computing unit to serve the plurality of stored information and the repair triage application to the first computing unit over the network;

using the repair triage application to track the part during inspection and repair;

using the repair triage application to determine whether the part needs repair or removal from future use; and using the repair triage application to enable a customer to track the status during inspection and repair.

37. The method according to claim 36, further comprising using the repair triage application to assign a job number for a part and provide job information during inspection and repair.

38. The method according to claim 37, wherein the job information comprises inspection schedule and inspection results and repair schedule and repair results.

39. The method according to claim 36, further comprising using the repair triage application to schedule the inspection of the part.

40. The method according to claim 36, further comprising using the repair triage application to plan the repair of the part.

41. The method according to claim 36, further comprising using the repair triage application to search the stored plurality of repair information for other parts that have experienced similar conditions.

42. The method according to claim 36, further comprising using the repair triage application to perform a cost benefit analysis that determines the costs and benefits associated with repairing the part or scrapping the part.

43. The method according to claim 36, further comprising using the repair triage application to recommend a solution to repair the part.

* * * * *